(12) United States Patent
Sei et al.

(10) Patent No.: US 8,845,020 B2
(45) Date of Patent: Sep. 30, 2014

(54) VEHICLE SEAT

(75) Inventors: Kousuke Sei, Aichi-ken (JP); Keisuke Yamamoto, Aichi-ken (JP); Yukinori Sugiura, Aichi-ken (JP); Takanori Kinoshita, Aichi-ken (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 20 days.

(21) Appl. No.: 13/557,589

(22) Filed: Jul. 25, 2012

(65) Prior Publication Data
US 2013/0033079 A1 Feb. 7, 2013

(30) Foreign Application Priority Data

Aug. 4, 2011 (JP) ................................. 2011-170919

(51) Int. Cl.
| A47C 31/02 | (2006.01) |
| B60N 2/70 | (2006.01) |
| A47C 7/24 | (2006.01) |
| B60N 2/58 | (2006.01) |

(52) U.S. Cl.
CPC ............ B60N 2/7029 (2013.01); A47C 31/023 (2013.01); A47C 7/24 (2013.01); B60N 2/5825 (2013.01)
USPC ..................................... 297/218.3; 297/218.5

(58) Field of Classification Search
CPC ........ A47C 31/023; A47C 7/24; A47C 31/02; A47C 4/06; B60N 2/6018; B60N 2/58

USPC ............................... 297/228.1, 228.13, 218.5
See application file for complete search history.

(56) References Cited

U.S. PATENT DOCUMENTS

| 4,558,905 | A | * | 12/1985 | Natori ........................ 297/452.6 |
| 4,583,783 | A | * | 4/1986 | Kanai ....................... 297/452.56 |
| 4,643,480 | A | * | 2/1987 | Morita ..................... 297/452.38 |
| 4,832,400 | A | * | 5/1989 | Aoki et al. .................. 297/284.4 |
| 5,295,732 | A | * | 3/1994 | Boisset ....................... 297/452.1 |
| 5,954,395 | A | * | 9/1999 | Moulins et al. ............. 297/218.4 |

FOREIGN PATENT DOCUMENTS

| CN | 101933730 | 1/2011 |
| JP | 2009-179090 | 8/2009 |

OTHER PUBLICATIONS

U.S. Appl. No. 13/490,861 to Kenji Kawano et al., filed Jun. 7, 2012.
Chinese Office action, dated Jun. 17, 2014, along with an English-language translation thereof.

* cited by examiner

*Primary Examiner* — Sarah B McPartlin
(74) *Attorney, Agent, or Firm* — Greenblum & Bernstein, P.L.C.

(57) ABSTRACT

A cushion is arranged on a frame member and covered by a cover. Also, a support member is attached to the frame member and extends in a vertical direction when a seat back is in an upright position, and an attaching portion to which a portion of the cover attaches is provided on the support member. The support member supports the cushion on the frame member, and the portion of the cover is attached tucked in to the attaching portion.

5 Claims, 5 Drawing Sheets

VEHICLE SEAT

INCORPORATION BY REFERENCE

The disclosure of Japanese Patent Application No. 2011-170919 filed on Aug. 4, 2011 including the specification, drawings and abstract is incorporated herein by reference in its entirety.

BACKGROUND OF THE INVENTION

1. Field of the Invention

The invention relates to a vehicle seat provided with a frame member, a cover, and an attaching portion (i.e., a portion to which the cover is attached tucked in to the frame member side).

2. Description of Related Art

One such known vehicle seat is a vehicle seat described in Japanese Patent Application Publication No. 2009-179090 (JP 2009-179090 A). This vehicle seat has a seat cushion, and a seat back that is raisably connected to the seat cushion. The seat back includes an arch-shaped frame member that forms a seat frame, a cushion that forms the outer shape of the seat, a cover that is able to cover the cushion, a cushion spring, and an attaching member. The cushion spring is a mesh member (that is generally rectangular), and is set inside the frame member. Also, the attaching member is a linear member that extends in the seat width direction, and is attached by being connected to both sides of the frame member.

With the related art, the cushion is supported by the cushion spring while being arranged on the frame member. Next, the cushion is covered with the cover, and a portion of the cover is tucked in to the frame member side (inside the seat) on the back side of the seat back. Then the shape of the back side of the seat back is drawn in so that the width narrows near the upper portion of the seat by attaching a portion of the cover to the attaching member. This shape of the back surface of the seat back is preferable for raising the seat cushion of another vehicle seat (a vehicle seat provided with a double folding mechanism) that is arranged behind the vehicle seat, for example, and stowing that seat cushion against the back surface of the seat back.

With the related art, a plurality of members (i.e., the cushion spring and the attaching member) are provided on the frame member, and the cushion and the cover are arranged. Therefore, the structure of the related art has room for improvement from the viewpoint of reducing the number of parts of the seat.

SUMMARY OF THE INVENTION

In view of the foregoing problems, the invention provides a vehicle seat in which a portion of the cover is attached tucked in to the frame member side, while an increase in the number of parts of the seat is suppressed as much as possible.

One aspect of the invention relates to a vehicle seat that includes a seat cushion, and a seat back that is raisably connected to the seat cushion. The seat back has a frame member that forms a seat frame, a cushion that forms an outer shape of the seat, and a cover that covers the cushion. In the invention, the cushion is covered by the cover while being arranged on the frame member. A portion of the cover is attached tucked in to the frame member side. With this kind of seat structure, it is preferable that the portion of the cover be attached tucked in to the frame member side, while an increase in the number of parts of the seat be suppressed as much as possible.

Therefore, in this invention, a support member is attached to the frame member and provided extending in the vertical direction when the seat back is in an upright position, and an attaching portion to which the portion of the cover attaches is provided on the support member. Also, the portion of the cover is attached tucked in to the attaching portion, while the cushion on the frame member is supported by the support member (the support member is a structure that has two functions, i.e., it serves to support the cushion and it serves to attach the cover). With the vehicle seat in this aspect, a portion of the cover is able to be attached tucked in to the frame member side, while an increase in the number of parts of the seat is suppressed as much as possible.

In the vehicle seat of the aspect described above, the attaching portion described above may be formed by having a portion of the support member protrude out in a direction that differs from a seating side of the seat. Also, the portion of the cover may be attached to the attaching portion via a retaining member. As a result, the location where the cover portion and the attaching portion are engaged is arranged in a direction that differs from the seating side of the seat, so seating comfort of the seat can be well maintained. Also, a portion of the cover can be attached tucked in, while seating comfort of the seat can be well maintained.

In the vehicle seat of the aspect described above, a pair of the support members may be provided, and each of the pair of support members may have a first portion, and a second portion on which the attaching portion is provided. Also, the two second portions (i.e., the two attaching portions) of the pair of support members may be farther apart in a seat width direction than the two first portions, when the pair of support members are attached to the frame member. Separating the two attaching portions in the seat width direction enables the portion of the cover to be stably attached.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
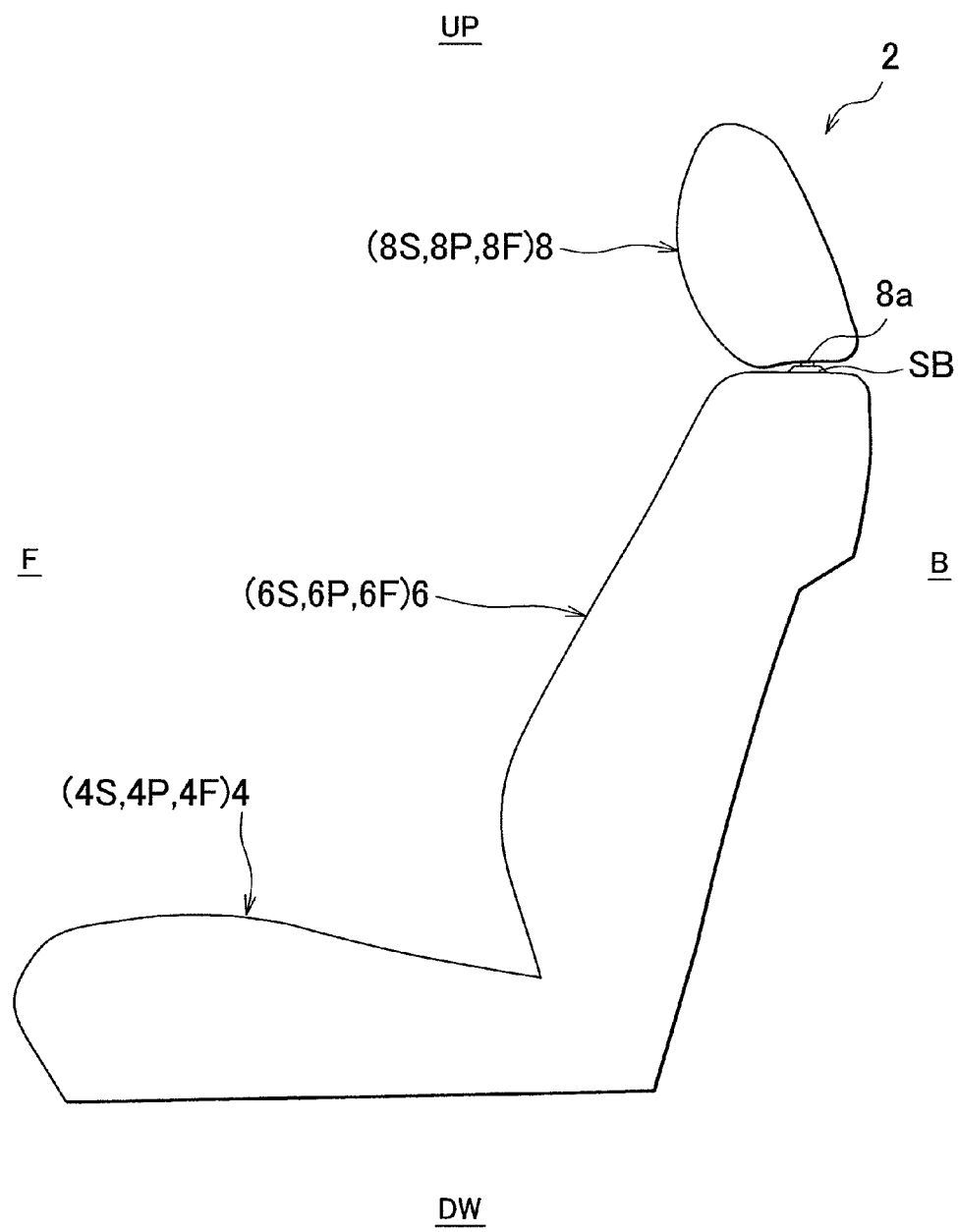
FIG. 1 is a side view schematically showing a vehicle seat.

Hereinafter, example embodiments of the invention will be described with reference to FIGS. 1 to 5. In the drawings, reference character F denotes a forward direction with respect to the vehicle seat, reference character B denotes a backward or rearward direction with respect to the vehicle seat, reference character UP denotes an upward direction with respect to the vehicle seat, and reference character DW denotes a downward direction with respect to the vehicle seat, as appropriate. In this example embodiment, another vehicle seat, not shown, may be arranged behind the vehicle seat 2.

The vehicle seat 2 in FIG. 1 includes a seat cushion 4, a seat back 6, and a headrest 8. Each of these seat structure members includes a frame member (4F, 6F, 8F) that forms a seat frame, a cushion (4P, 6P, 8P) that forms the outer shape of the seat, and a cover (4S, 6S, 8S) that covers the cushion. Here, the headrest 8 has a pair of stay members 8a and is attached to an upper portion of the seat back 6 via support brackets SB (see FIGS. 1 and 2). The pair of stay members 8a are rod-shaped members. The pair of stay members 8a are arranged parallel to one another a predetermined distance apart, on a lower portion of the headrest 8.

The seat back 6 is a member that is connected to the seat cushion 4 in a manner that enables it to be reclined and raised with respect to the seat cushion 4. The seat back 6 includes the frame member 6F, the cushion 6P, and the cover 6S described above, as well as a support member 10, an absorbing member 20, and a retaining member 30 that will be described later (see FIGS. 1, 2, and 5). In this example embodiment, the cushion 6P is arranged on the frame member 6F. Also, the cushion 6P is covered by the cover 6S, and a portion of the cover (i.e., a cover portion S1) is attached tucked in to the frame member 6F side (see FIG. 5). With this type of seat structure, the cover portion S1 is preferably attached tucked in to the frame member 6F side, while an increase in the number of parts of the seat is suppressed as much as possible. Therefore, in this example embodiment, the cover portion S1 is attached tucked in to the frame member 6F side, while an increase in the number of parts of the seat is suppressed as much as possible, by the structure described below.

Figure 2:
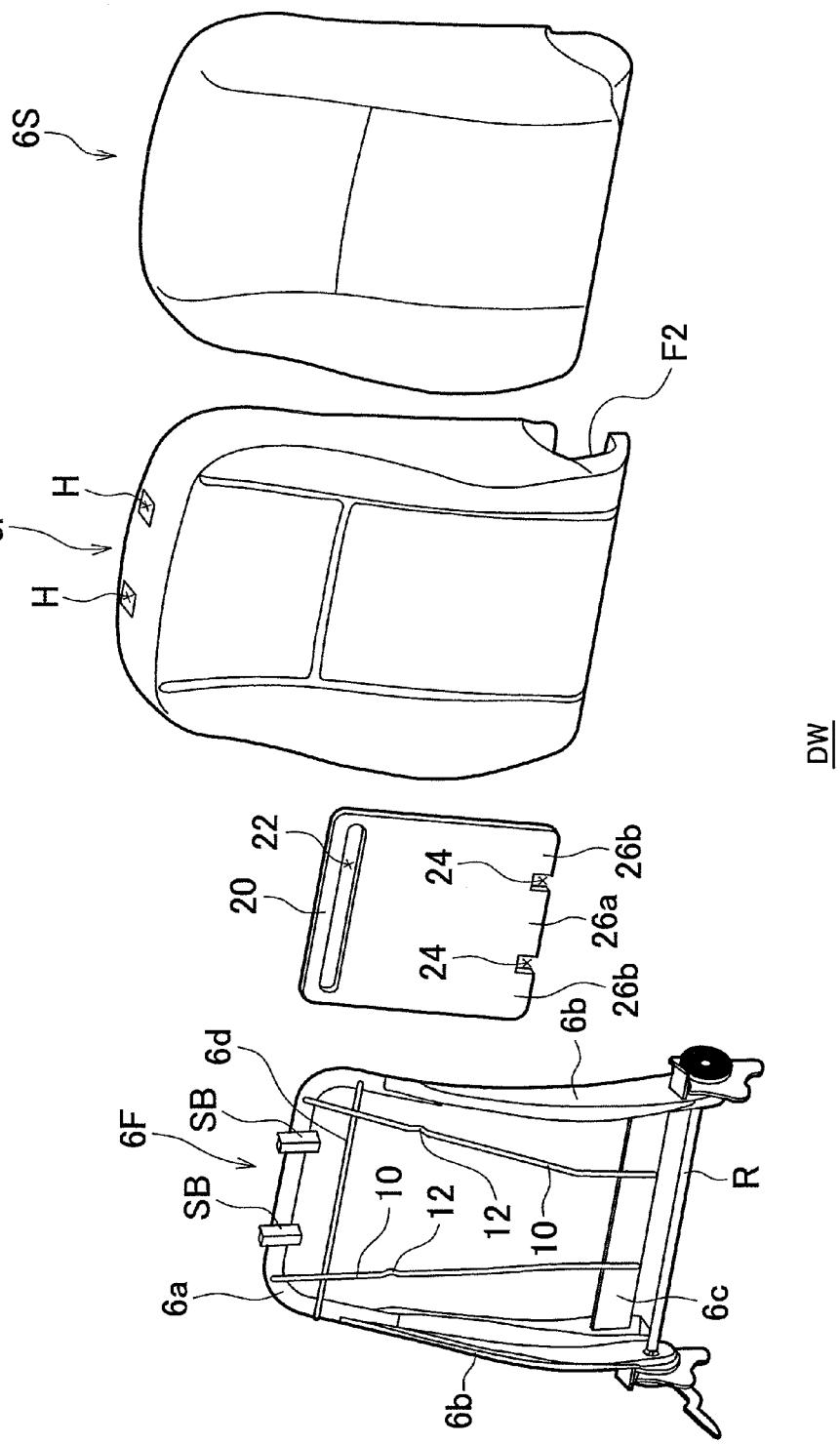
FIG. 2 is an exploded perspective view of a seat back.
Figure 3:
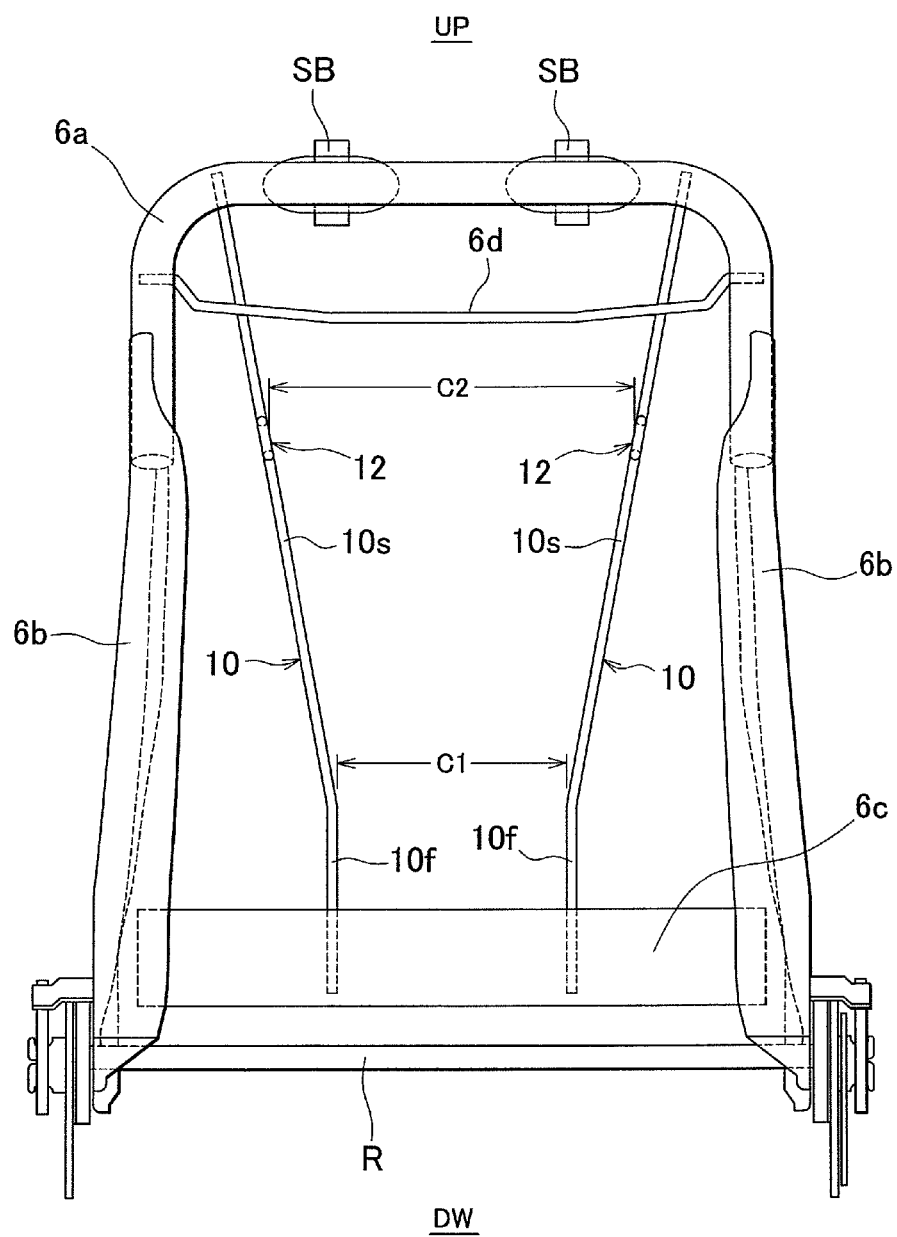
FIG. 3 is a back view of a frame member.

The arch-shaped frame member 6F includes an upper frame 6a, a pair of side frames 6b, a lower frame 6c, and a support member 10 (see FIGS. 1 to 3). The upper frame 6a is a rod-shaped member (having a generally inverted U-shape when viewed from the front) that forms an upper portion of the seat and includes a pair of support brackets SB and a linear member 6d. The linear member 6d is a rod-shaped member that extends between the upper sides (i.e., the pair of free ends) of the upper frame 6a, and is able to support the upper side of the cushion 6P that will be described later. The pair of support brackets SB are tubular members (that are generally rectangular) into which the stay members 8a can be inserted. In this example embodiment, the pair of support brackets SB are arranged parallel to one another a predetermined distance apart on the rear surface side of the upper frame 6a.

Also, the pair of side frames 6b are flat plate members that form side portions of the seat, and are fixed to lower ends (i.e., free ends) of the upper frame 6a. A reclining shaft R (that is rod-shaped) is attached extending between the pair of side frames 6b, near the lower ends of the side frames 6b. The reclining shaft R is the rotational center when the seat back 6 is reclined or raised (i.e., during a pivoting operation) with respect to the seat cushion 4. Also, the lower frame 6c is a flat plate member that extends between the pair of side frames 6b at the lower portion of the seat.

The support member 10 is a long rod member (i.e., a member that can be arranged between the upper frame 6a and the lower frame 6c), and includes an attaching portion 12 that will be described later (see FIGS. 2 and 3). The support member 10 in this example embodiment is curved midway, and has a first portion 10f and a second portion 10s. The first portion 10f is a linear portion (that is relatively short) that forms one side of the support member 10. Also, the second portion 10s is a portion (that is relatively long) that is inclined in the seat width direction from the first portion 10f, and forms the other side of the support member 10.

In this example embodiment, a pair of the support members 10 are attached to the frame member 6F so as to be bilaterally symmetrical, while being arranged apart in the seat width direction (see FIG. 3). At this time, one side (i.e., the first portion 10f) of each support member 10 is provided extending perpendicular while attached to the lower frame 6c. The two first portions 10f are arranged apart from one another in the seat width direction (clearance C1). Also, the other side (i.e., the second portion 10s) of each support member 10 is provided extending in the vertical (longitudinal) direction of the seat while attached to the upper frame 6a. At this time, the pair of support members 10 is arranged in a general Y-shape when viewed from the front, by appropriately adjusting the directions in which the support members 10 are arranged or the like. As a result, the two second portions 10s are able to be arranged so that they gradually become farther apart from each other toward the upper frame 6a.

The attaching portion 12 is a portion to which the cover portion S1 can be attached, and may be formed on each of the pair of support members 10 (i.e., the second portions 10s) (see FIGS. 2 and 3). The attaching portion 12 in this example embodiment is a portion that is curved in a general semicircle (when viewed from the side), and may be formed by deforming, i.e., curving, a portion midway (below the linear member 6d) in the second portion 10s. Also in this example embodiment, the attaching portions 12 are arranged protruding to the rear of the seat by appropriately adjusting the direction in which the support members 10 are arranged or the like. By being formed midway in the two second portions 10s, the two attaching portions 12 are arranged apart from each other in the seat width direction (clearance C2; C2>C1).

Figure 4:
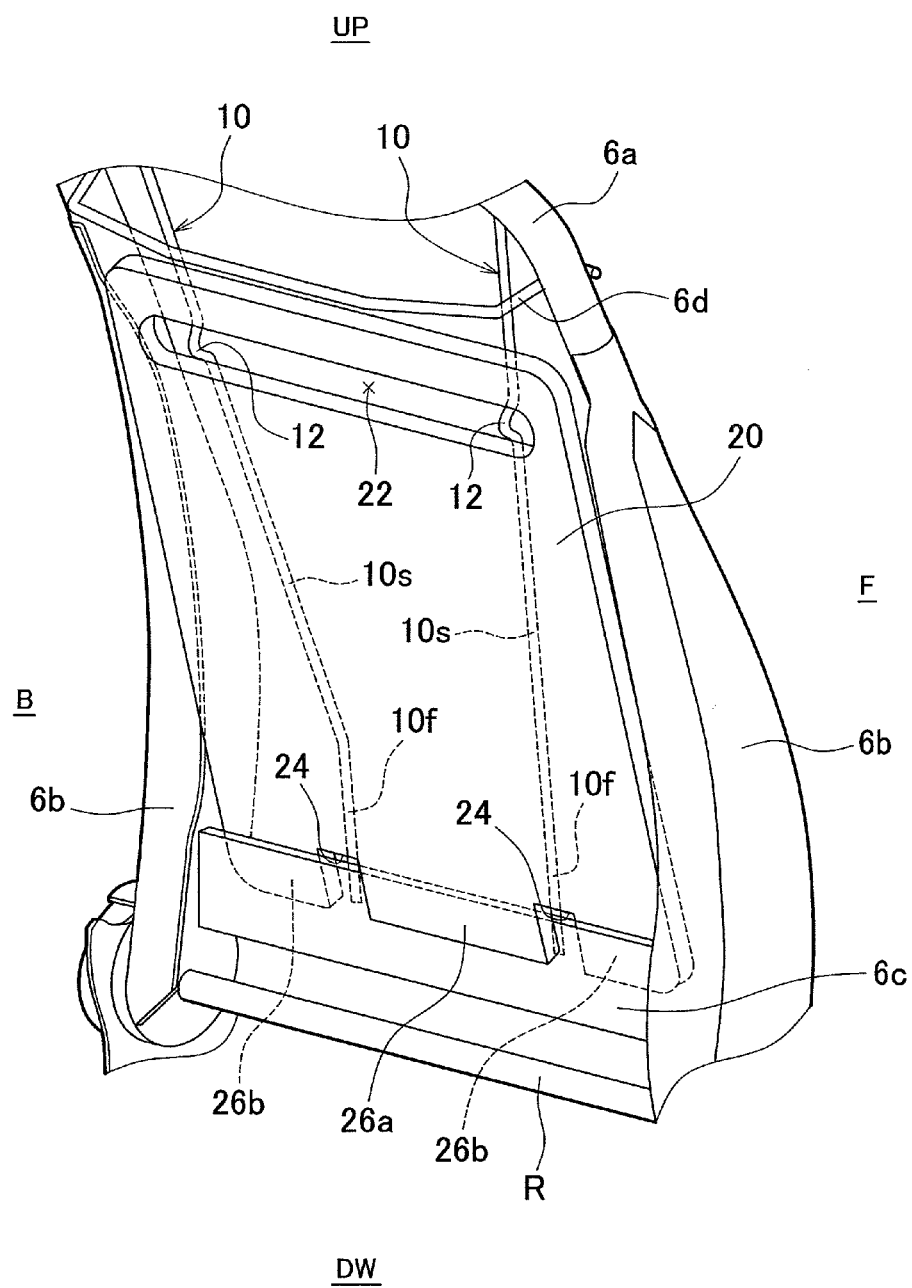
FIG. 4 is a perspective view of a portion of the seat back.

The absorbing member 20 is a plate-shaped member (that is generally rectangular) that can be arranged inside the frame member 6F, and includes a window portion 22 and a pair of attaching portions 24 (see FIGS. 2 and 4). The window portion 22 is a hole (a through-hole) that is long in the seat width direction, and may be formed in one side of the absorbing member 20 (in a position facing the attaching portion 12). Also, the pair of attaching portions 24 are groove-like portions (that are generally rectangular when viewed from the front) that extend in the vertical direction of the seat, and may be formed on the other side of the absorbing member 20. In this example embodiment, the other side of the absorbing member 20 is divided into three (i.e., divided into a center portion 26a and a pair of side portions 26b) by the pair of attaching portions 24. The center portion 26a is a portion (that is generally rectangular) that is arranged between the pair of attaching portions 24, and the pair of side portions 26b are portions (that are generally rectangular) that are arranged one on each side of the center portion 26a. The absorbing member 20 is flexible so that it can bend in response to contact with another member (such as an occupant), and may be made of resin foam or fiberboard, for example.

Figure 5:
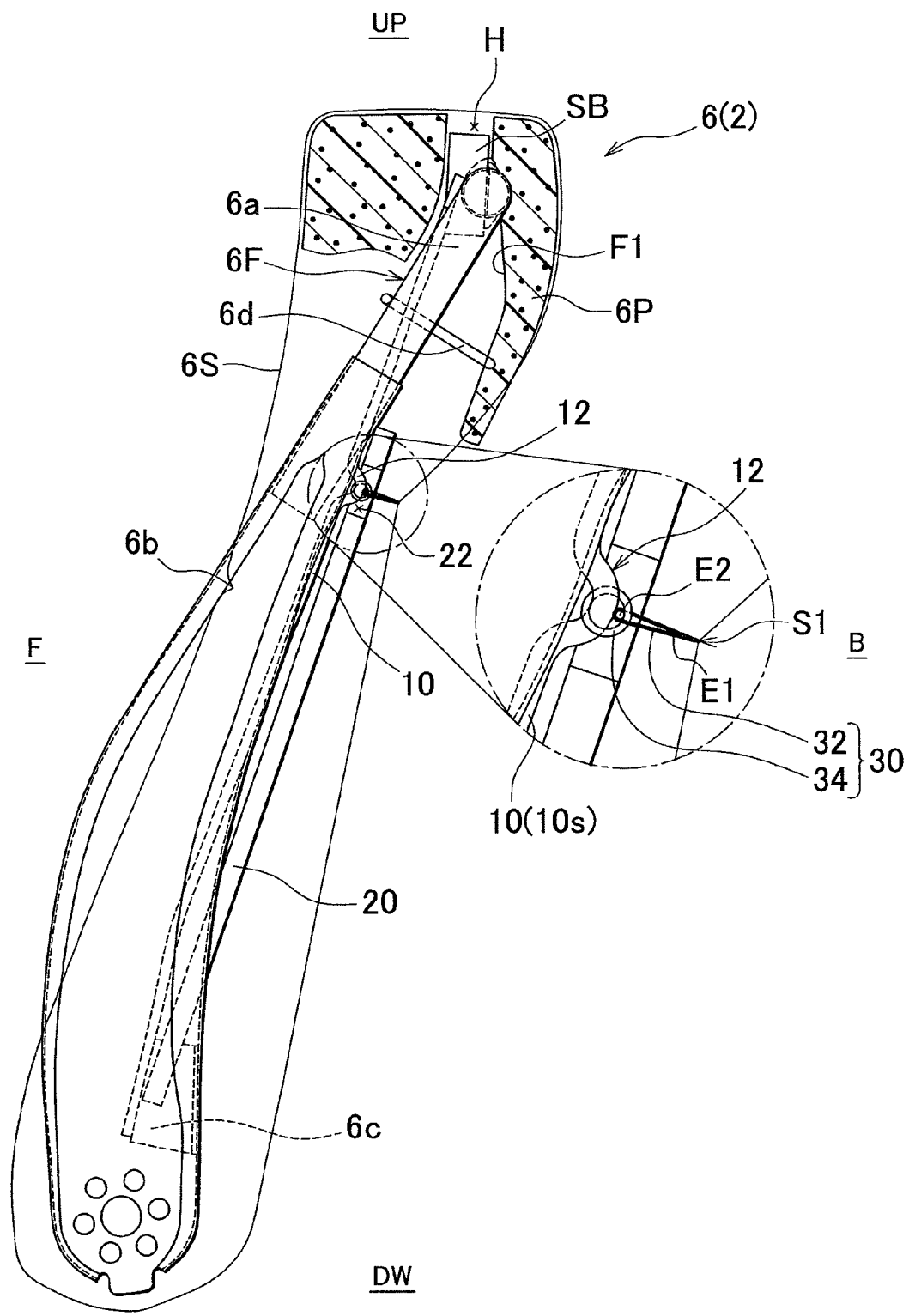
FIG. 5 is a transparent side view of the seat back.

The cushion 6P is a member that elastically supports an occupant, and may be made of foam resin such as polyurethane foam, for example (see FIGS. 2 and 5). The cushion 6P in this example embodiment is a member that has a generally long shape (when viewed from the front) that follows the outer shape of the seat, and includes a pair of insertion holes H, a first engaging portion F1, and a second engaging portion F2. The pair of insertion holes H are insertion holes that are provided in the upper portion of the cushion 6P, and into which the stay members are able to be inserted. Also, the first engaging portion F1 is a recessed portion (having a generally inverted U-shape when viewed in a longitudinal sectional view) that is provided on a back surface of the upper portion of the cushion 6P, and is able to receive the upper frame 6a. Also, the second engaging portion F2 is a recessed portion (that is generally U-shaped when viewed in a longitudinal sectional view) that is provided on the back surface of the lower portion of the cushion 6P, and is able to receive the lower frame 6c.

The cover 6S is a bag-shaped member that is able to cover the cushion 6P, and may be made by sewing a plurality of cover pieces together, for example (see FIGS. 2 and 5). The material of the cover 6S is not particularly limited. Some possible examples are fabric (woven, knit, or non-woven fabric) and leather (both natural leather and synthetic leather). In this example embodiment, a bag-shaped cover 6S is made by joining a plurality of cover pieces together, for example. At this time, end portions of adjacent cover pieces are overlapped and folded in (thus forming the cover portion S1) at the upper portion of the back surface of the cover 6S. The cover portion S1 (i.e., the portion where the pieces overlap) is a linear shape that extends in the seat width direction and protrudes toward the inside of the seat, where it is attached to a retaining member 30 that will be described later.

The retaining member 30 is a member that holds the cover portion S1 to the support member 10, and includes a band-shaped body 32, and a ring member 34 (see FIG. 5). The band-shaped body 32 is a band-shaped member that is long in the seat width direction. Also, the ring member 34 is a generally C-shaped member that is closed (so that it is generally O-shaped) with a tool or the like. In this example embodiment, a split end E1 and a joined end E2 are formed while the band-shaped body 32 is folded in. The joined end E2 is a folded-in portion of the band-shaped body 32, and the split end E1 is a portion where the end portions of the band-shaped body 32 overlap. A pair of through-holes (not denoted by a reference character) are formed in the joined end E2, such that the ring member 34 is able to be inserted through them. Also, the split end E1 is made to protrude to the inside of the cover 6S while sewn to the cover portion S1 (i.e., the portion where the pieces overlap). At this time, the joined end E2 (the through-holes) are arranged opposite the attaching portion 12, so both members are able to be engaged together by the ring member 34.

Referring to FIGS. 2 and 3, the cushion 6P is supported by the pair of support members 10 while being arranged on the frame member 6F (the seating side).

In this example embodiment, the upper frame 6a is fit into the first engaging portion F1, thereby attaching the upper side of the cushion 6P to the upper frame 6a. At this time, the upper side of the cushion 6P is supported by the linear member 6d and protrudes toward the rear of the seat. Next, the lower frame 6c is fit into the second engaging portion F2, thereby attaching the lower side of the cushion 6P to the lower frame 6c. The cushion 6P is able to be attached to the frame member 6F by supporting the back side of the cushion 6P with the pair of support members 10.

Next, referring to FIG. 4, the pair of attaching portions 12 are inserted into the window portion 22 while the absorbing member 20 is arranged on the back side of the frame member 6F (i.e., the absorbing member 20 is positioned with respect to the frame member 6F). Then the lower side of the absorbing member 20 is attached to the lower frame 6c by inserting the lower frame 6c into the pair of attaching portions 24. At this time, the center portion 26a is arranged on the back side of the lower frame 6c, and the pair of side portions 26b are arranged on the seating side of the lower frame 6c. The absorbing member 20 is able to be stably attached to the lower frame 6c by sandwiching the lower frame 6c between the center portion 26a and the pair of side portions 26b.

Referring to FIGS. 2 and 5, the cover portion S1 is attached by being tucked in to the frame member 6F side, while covering the cushion 6P with the cover 6S.

In this example embodiment, an end portion (the lower end) of the cover 6S is attached to the lower frame 6c after covering the cushion 6P with the cover 6S. The cover 6S extends from the upper portion of the cushion 6P to the rear side of the seat while being arranged along the cushion 6P (i.e., the seating side). At this time, the cover 6S on the back side of the seat bulges out to the rear of the seat from the outer shape of the upper portion of the cushion 6P (a protrusion toward the rear of the seat), so a gap is created between the cushion 6P and the absorbing member 20.

Therefore, the cover portion S1 is pulled, together with the band-shaped body 32, to the frame member 6F side and attached to the support member 10 (i.e., the attaching portion 12). In this example embodiment, the ring member 34 is inserted into the holes in the band-shaped body 32 while being hooked around the attaching portion 12. Next, the ring member 34 is closed, thereby holding the cover portion S1 to the attaching portion 12. At this time, the cover portion S1 is able to be attached in a precise position (i.e., deviation from the suspending position can be prevented or reduced) by using the attaching portion (i.e., the protrusion to the rear of the seat) as a marker.

Also, in this example embodiment, the cover portion S1 is tucked in and attached to the attaching portion 12 (below the linear member 6d), so the shape of the back surface of the seat back 6 is drawn in so that the width narrows near the upper portion of the seat. As a result, the seat back 6 has a sleek appearance with a well-designed seat shape. Also, a seat cushion of another vehicle seat (a seat provided with a double folding mechanism), for example, can be raised and that seat cushion (i.e., the other vehicle seat) stowed against the back surface of the seat back 6. Also in this example embodiment, even if another member (such as a knee of an occupant seated in the other vehicle seat) hits the back side of the seat back 6, the absorbing member 20 will bend or the like, so the impact received by the other member can be absorbed as much as possible.

Just as described above, in this example embodiment, the structure is one in which the cover portion S1 is tucked in and attached to the attaching portion 12 while the cushion 6P on the frame member 6F is supported by the support member 10 (i.e., the structure can have two purposes). Also in this example embodiment, the engaging locations of the cover portion S1 and the attaching portion 12 (i.e., portions that may cause discomfort) are arranged protruding toward the rear of the seat. Therefore, seating comfort of the vehicle seat is able to be well maintained. Also in this example embodiment, the attaching portions 12 are arranged apart from one another in the seat width direction, so the attaching dimension of the cover 6S when viewed in the seat width direction is able to be large (i.e., the cover portion S1 is able to be stably attached to the attaching portions 12). Therefore, according to this example embodiment, the cover portion S1 is able to be attached tucked in to the frame member 6F side while an increase in the number of parts of the seat is suppressed.

The vehicle seat of this example embodiment is not limited to the example embodiment described above. That is, various other example embodiments are also possible. 1) In the example embodiment, a single attaching portion 12 is provided on each support member, but a plurality of attaching portions may also be provided on each support member. At this time, the plurality of attaching portions may be formed parallel in the vertical direction of the seat when the seat back is in an upright position, on each of the support members. 2) Also in this example embodiment, the attaching portion 12 is curved in a generally semicircular shape (when viewed from the side), but the shape of the attaching portion is not limited to this. For example, a flat plate-shaped attaching portion may be provided erect toward the rear of the seat, and a through-hole through which the ring member can be inserted may be provided in the attaching portion. Also, a generally J-shaped protruding portion may be provided as the attaching portion, and the ring member may be hooked onto this generally J-shaped protruding portion.

3) Also in the example embodiment, the attaching portions 12 are arranged protruding to the rear of the seat, but the direction in which the attaching portions protrude is not limited to this. The attaching portions may also be arranged protruding in the seat width direction, for example. Further, the attaching portions may also be arranged protruding out on the seating side as long as they will not significantly detract from the seating comfort of the seat. 4) Also in the example embodiment, the attaching portions 12 are formed on the second portions 10s, but they may also be formed on the first portions 10f.

5) Also in the example embodiment, the pair of support members 10 are attached to the frame member 6F, but a single support member (a generally H-shaped support member when viewed from the front, for example), or three or more support members, may also be attached to the frame member 6F. 6) Also in the example embodiment, each of the support members 10 has the first portion 10f and the second portion support member 10s, but the structure of the support member is not limited to this. For example, the support member may be any of a variety of shapes, including straight, stepped, zigzagged, and crank-shaped. Also, the support member may be attached in any of a variety of orientations, such as perpendicular or inclined, with respect to the frame member. 7) Also in the example embodiment, the pair of support members 10 are arranged in a general Y-shape when viewed from the front, but the arrangement of the support member is not limited to this. For example, a plurality of support members may be arranged parallel to each another, or arranged crossing each other.

8) Also in the example embodiment, the structures of various members of the vehicle seat 2 are described, but the structures are not limited to these. For example, an example which the absorbing member 20 is provided on the vehicle seat 2 is described, but the absorbing member 20 may also be omitted.

What is claimed is:

1. A vehicle seat comprising:
   a seat cushion;
   a seat back that is raisably connected to the seat cushion, the seat back having a frame member that forms a seat frame, a cushion that forms an outer shape of the seat, and a cover that covers the cushion; and
   a support member that is attached to the frame member and extends in a vertical direction when the seat back is in an upright position, the support member being a rod member and having an attaching portion to which a portion of the cover attaches, and supporting the cushion on the frame member, wherein
   the attaching portion is defined by a portion of the support member that protrudes away from a rear side of the seat back in a direction that is opposite from a seating side of the seat, and
   the portion of the cover is tucked in toward the frame member to attach to the attaching portion via a retaining member.

2. The vehicle seat according to claim 1, wherein a pair of the support members are attached to the frame member and each of the pair of support members has a first portion and a second portion on which the attaching portion is provided, and a distance between the two second portions of the pair of support members is longer in a seat width direction than a distance between the two first portions.

3. The vehicle seat according to claim 2, wherein the second portions are positioned higher than the first portions when the seat back is in the upright position.

4. The vehicle seat according to claim 2, wherein the pair of support members are connected to an upper portion and a lower portion of the frame member and are arranged in the vertical direction, when the seat back is in the upright position.

5. The vehicle seat according to claim 1, wherein the retaining member includes a band-shaped body and a ring member, the ring member engages with the attaching portion and the band-shaped body, and the band-shaped body engages with the portion of the cover and the ring member.

* * * * *